US012802117B2

(12) United States Patent
Gupta

(10) Patent No.: US 12,802,117 B2
(45) Date of Patent: Nov. 17, 2026

(54) GENERALIZED ENTERPRISE CATALOG CLASSIFICATION FOR SHORTHAND ITEM DESCRIPTORS

(71) Applicant: Punchh Inc., San Mateo, CA (US)

(72) Inventor: Rajat Gupta, Jalpur (IN)

(73) Assignee: Punchh Inc., San Mateo, CA (US)

( * ) Notice: Subject to any disclaimer, the term of this patent is extended or adjusted under 35 U.S.C. 154(b) by 172 days.

(21) Appl. No.: 18/792,939

(22) Filed: Aug. 2, 2024

(65) Prior Publication Data

US 2024/0394778 A1 Nov. 28, 2024

Related U.S. Application Data

(63) Continuation of application No. 17/339,302, filed on Jun. 4, 2021, now Pat. No. 12,182,844.

(51) Int. Cl.

| | |
|---|---|
| ***G06Q 30/0601*** | (2023.01) |
| ***G06F 18/2431*** | (2023.01) |
| ***G06F 40/30*** | (2020.01) |
| ***G06N 5/02*** | (2023.01) |
| ***G06N 20/20*** | (2019.01) |

(52) U.S. Cl.

CPC ..... *G06Q 30/0631* (2013.01); *G06F 18/2431* (2023.01); *G06F 40/30* (2020.01); *G06N 5/02* (2013.01); *G06N 20/20* (2019.01)

(58) Field of Classification Search

None

See application file for complete search history.

(56) References Cited

U.S. PATENT DOCUMENTS

| | | | | |
|---|---|---|---|---|
| 7,698,170 | B1 * | 4/2010 | Darr | G06Q 30/02 705/26.35 |
| 10,909,442 | B1 * | 2/2021 | Szarvas | G06N 3/08 |
| 11,163,956 | B1 | 11/2021 | De Peuter et al. | |
| 11,367,116 | B1 * | 6/2022 | Verma | G06N 20/00 |
| 12,182,844 | B2 | 12/2024 | Gupta | |

(Continued)

OTHER PUBLICATIONS

Clustering-Based Combinatorial Approach to Unsupervised Matching of Product Titles (Year: 2019).*

(Continued)

*Primary Examiner* — Victoria E. Frunzi

(74) *Attorney, Agent, or Firm* — Foley Hoag LLP; Erik A. Huestis; Joshua S. Matloff

(57) ABSTRACT

A system and a method are disclosed for classifying shorthand item descriptors in accordance with an enterprise catalog. An enterprise data management system uses one more models to determine items in the enterprise catalog that match a shorthand descriptor of an item. Shorthand item descriptors may originate from various transaction data such as at point-of-sale (POS) machines or online ordering systems. The enterprise data management system uses a first model to determine a normalized representation of the shorthand item descriptor. The enterprise data management system furthers used a second model to classify the normalized representation as one or more items included in the enterprise catalog, where the second model is trained through a supervised machine learning process using data corresponding to an enterprise catalog of one or more particular enterprises.

17 Claims, 6 Drawing Sheets

(56) References Cited

U.S. PATENT DOCUMENTS

| | | | | |
|---|---|---|---|---|
| 2005/0288920 | A1* | 12/2005 | Green | G06F 40/58 704/3 |
| 2018/0082183 | A1* | 3/2018 | Hertz | G06Q 10/10 |
| 2021/0182912 | A1* | 6/2021 | Misra | G06Q 30/0269 |
| 2021/0224258 | A1 | 7/2021 | Faruquie et al. | |
| 2021/0383453 | A1 | 12/2021 | Gupta | |

OTHER PUBLICATIONS

Rucco et al., "A methodology for part classification with supervised machine learning", Cambridge.org/aie, dated Jul. 7, 2018.

* cited by examiner

GENERALIZED ENTERPRISE CATALOG CLASSIFICATION FOR SHORTHAND ITEM DESCRIPTORS

CROSS REFERENCE TO RELATED APPLICATIONS

This application is a continuation of U.S. patent application Ser. No. 17/339,302, filed on Jun. 4, 2021, which claims the benefit of Indian Provisional Application No. 202041023402, filed Jun. 4, 2020. The teachings of the above listed applications are hereby incorporated by reference herein in its entirety.

TECHNICAL FIELD

The disclosure generally relates to machine classification techniques, and more particularly, to classifying shorthand item descriptors in accordance with an enterprise catalog.

BACKGROUND

Text is often used to describe point-of-sale (POS) data or other inventory-related data for an enterprise, such as sale receipts or online transactions. Outputs of POS systems for such enterprises are not standardized due to the use of a wide array of different POS systems, and manual programming of some POS systems, thus resulting in a lot of noise in the POS data. For example, different brick-and-mortar locations of a larger enterprise (e.g., a food chain or retail organization) may each collect data using different or non-standardized POS systems. A human operator of a given POS machine may write shorthand and abbreviated names, such as "btr chkn" instead of "butter chicken." Such inconsistencies in POS data or other inventory-related data for an enterprise leads to incorrect analysis of transaction data and enterprise reporting. In particular, such inconsistencies lead to errors in analyses performed by computer systems or human reviewers using datasets derived from inconsistent data, such as for performing predictive modeling of customer transaction behavior.

Conventional systems use complex regular expression (regex) matching algorithms to interpret shorthand item descriptors. However, such techniques are inaccurate and non-generalizable. In particular, regex matching algorithms are built for particular use-cases and cannot dynamically adapt to previously unseen or unexpected inputs that they are not specifically configured to handle. Similarly, regex matching algorithms cannot be applied to a different use-case without being rebuilt and thus cannot be scaled or otherwise used in a generalized computing environment.

SUMMARY

Described herein are embodiments of systems and methods for classifying shorthand item descriptors in accordance with an enterprise catalog. An enterprise data management system described herein may use one more models to determine items in the enterprise catalog that match a shorthand descriptor of an item (also referred to herein as a non-normalized item descriptor). The enterprise data management system may receive shorthand item descriptors originating from various transaction data, e.g., at point-of-sale (POS) machines, online ordering systems, or other suitable sources. The enterprise data management system may use a first model to determine a normalized representation of the shorthand item descriptor (e.g., a correctly spelled or otherwise generically standardized representation). The enterprise data management system may further use a second model to classify the normalized representation as one or more items included in the enterprise catalog. In embodiments, the second model is trained through a supervised machine learning process using data corresponding to enterprise catalog data of one or more particular enterprises. Through these techniques, among other advantages, the enterprise data management system provides a process for accurately classifying shorthand item descriptors according to enterprise catalogs of individual enterprises that can be generalized or otherwise scaled to different enterprises or domains.

In some embodiments, the enterprise data management system receives a shorthand descriptor of an item. For example, the received shorthand item descriptor may be "btr chkn." The enterprise data management system inputs the shorthand descriptor into a first model. As output from the first model the enterprise data management system receives a normalized descriptor of the item corresponding to the shorthand descriptor. For instance, the first model may output a normalized item descriptor "butter chicken." In some cases the first model may output multiple candidate normalized item descriptors, e.g., "butter chicken" and "batter chicken." The enterprise data management system determines one or more categories corresponding to the normalized descriptor. For example, the enterprise data management system may determine that "butter" and "chicken" correspond to a category "meal." The enterprise data management system inputs the normalized descriptor and the one or more categories into a second model, wherein the second model is trained on data corresponding to an enterprise catalog using a supervised learning process. As output from the second model enterprise data management system receives an identification of an item included in the enterprise catalog corresponding to the normalized descriptor. For example, the second model may output a particular name for "butter chicken" on a menu of a restaurant.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Exemplary Inventory Catalog Management System Architecture

Figure 1:
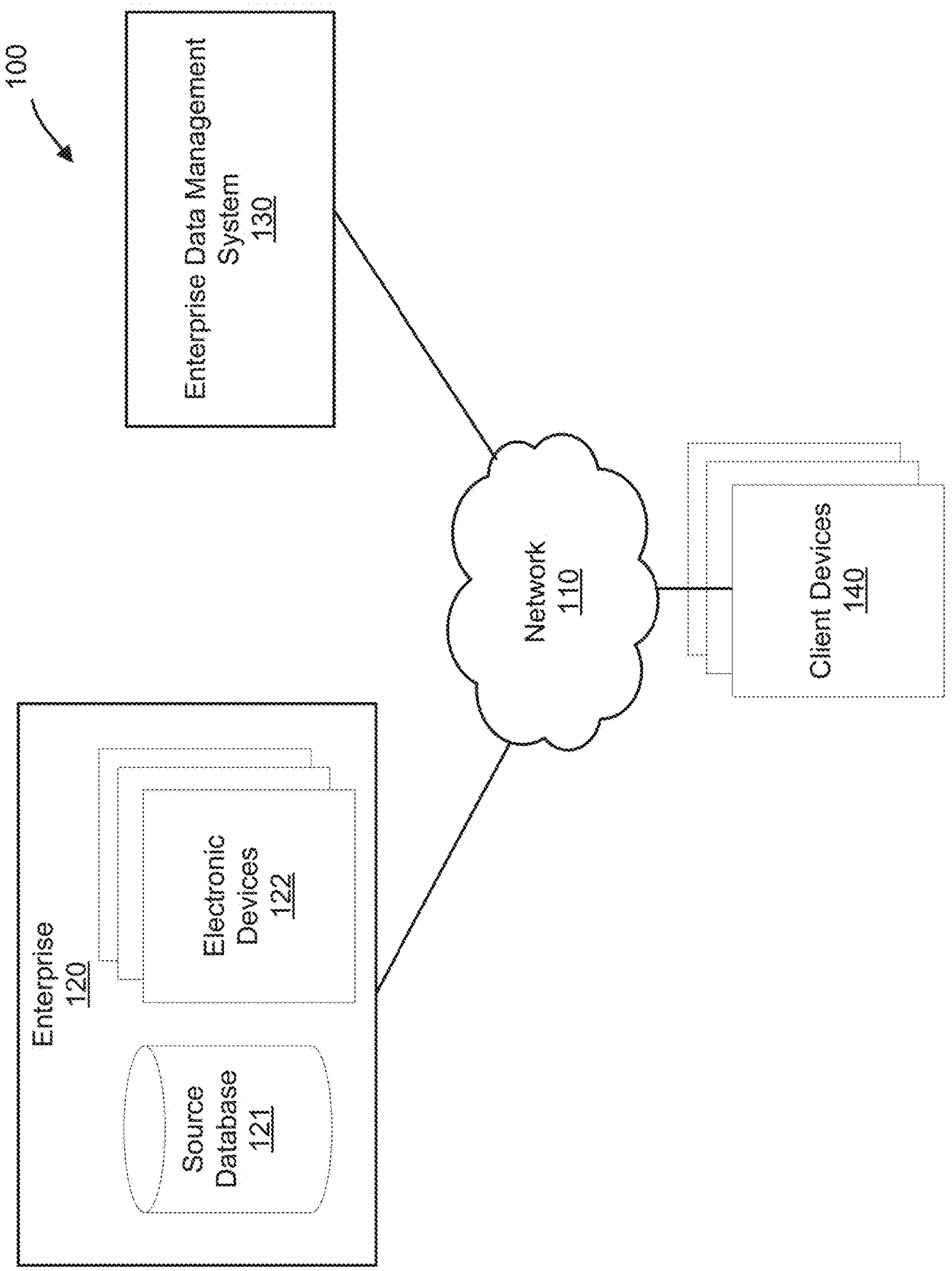
FIG. 1 is a network diagram illustrating a communication environment in which an enterprise data management system operates, according to at least one embodiment.

FIG. 1 is a network diagram illustrating communication environment 100 in which enterprise data management system 130 operates. Communication environment 100 includes network 110, enterprise 120, enterprise data management system 130, and one or more client devices 140. In alternative configurations, fewer, different or additional components may be included in communication environment 100.

Network 110 is communicatively coupled with at least one enterprise (e.g., enterprise 120), at least one client device (e.g., client devices 140), and enterprise data management system 130. Network 110 may be one or more networks including the Internet, a cable network, a mobile phone network, a fiberoptic network, or any suitable type of communications network.

Enterprise 120 may be any enterprise including a retail business, department store, super market, Internet retailer, small business, restaurant, or any suitable enterprise associated with (e.g., selling, aggregating, monitoring, etc.) an inventory of products or services. The terms "product" and "item," as used herein, refer to inventory of products or services sold by an enterprise to a customer. Enterprise 120 may implement a source database 121 storing various data relevant to operations of enterprise 120. For instance, source database 121 may include a list of inventory items (e.g., a list of groceries for sale at a supermarket or a list of menu items at a restaurant). Additionally, or alternatively, source database 121 may include point-of-sale (POS) data describes sales of inventory items of enterprise 120, such as a list of electronic receipts. Enterprise 120 may include electronic devices 123 that communicate with network 110 and performs various computing functions for enterprise 120. In particular, the electronic devices 122 may store source database 121. Electronic devices 122 may additionally, or alternatively, include one or more POS systems that receive POS data corresponding to enterprise 120. Such POS systems may include barcode scanners, credit or debit card readers, receipt printers, cash registers or drawers, monitors or tablets, or other suitable devices for facilitating item transactions. Although only one enterprise 120 is depicted in FIG. 1, the system environment 100 may include any number of enterprises with the same or different components as enterprise 120.

Enterprise data management system 130 manages data corresponding to one or more enterprises (e.g., enterprise 120). Enterprise data management system 130 may receive data corresponding to enterprise 120 (e.g., provided by one of the electronic devices 122 over network 110) or client devices 140 through network 110. In some embodiments, enterprise data management system 130 normalizes received data (also referred to herein as "standardizing"), such as normalizing shorthand descriptors of items (e.g., shorthand product names). The term "descriptor" as used herein, refers to a symbolic representation of an item, such as a textual or numerical representation. Descriptors may be normalized or non-normalized, where non-normalized item descriptors are also referred to herein as "shorthand" item descriptors. Normalized item descriptors are item descriptors represented in a universal or otherwise standardized format (such as the standard representation of a word in a language). As an example, non-normalized item descriptors may be abbreviations or misspelled versions of normalized descriptors, such as item descriptors on receipt or other POS or inventory data (e.g., "btr chkn" instead of "butter chicken"). A normalized item descriptor and a non-normalized item descriptor are referred to herein as "matching" if the normalized item descriptor is the intended normalized version of the item descriptor. For instance, "btr chkn" and "butter chicken" may be matching. The enterprise data management system 130 may match shorthand item descriptors (e.g., included in POS data) to items or categories of items corresponding to an enterprise (e.g., in an enterprise catalog or inventory), as will be described in greater detail below with reference to FIGS. 2 and 3A-B. Enterprise data management system 130 stores and maintains at least one database for inventory data, POS data, customer data, vector representations of data (e.g., vector representations of inventory, POS data, customers, or hybridized representations of any combination thereof), and software modules that perform various operations described herein in relation to enterprise data management system 130. Enterprise data management system 130 is further described below in the description of FIGS. 2 and 3A-3B.

Client devices 140 include mobile phones, laptop computers, tablet computers, personal computers, smart television, or any suitable computing device capable of communicating with a network (e.g., network 110). Each client device may be associated with a respective user or user profile. The user profile associated with a client device may be configurable or accessible by enterprise data management system 130 or enterprise 120.

Inventory Catalog Management System

Figure 2:
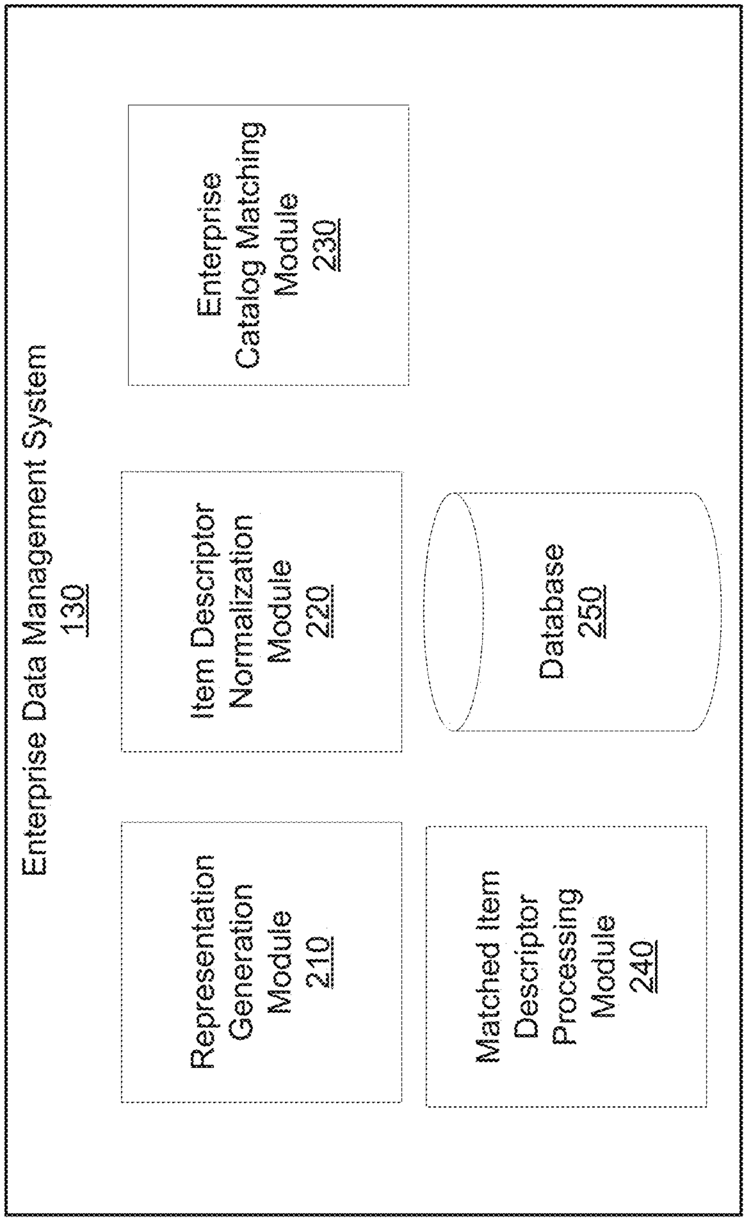
FIG. 2 is a block diagram of the enterprise data management system of FIG. 1, according to at least one embodiment.

FIG. 2 is a block diagram illustrating an embodiment of enterprise data management system 130 depicted in FIG. 1. In the embodiment shown, enterprise data management system 130 includes multiple software modules: representation generation module 210, item descriptor normalization module 220, enterprise catalog matching module 230, matched item descriptor processing module 240, and database 250. In some embodiments, enterprise data management system 130 includes additional, fewer, or different components for various functions.

Representation generation module 210 generates representations of data usable for processing by one or more components of the enterprise data management system 130, such as one or more machine learning models. In some embodiments, the representation generation module 210 generates numerical representations of data, such as vector representations as described above with reference to the enterprise data management system 130 in the description of FIG. 1. Representation generation module 210 may generate numerical representations of data using a variety of techniques, such as by using one or more embedding techniques. For instance, the representation generation module 210 may generate word embeddings to represent textual data, such as normalized or non-normalized descriptors represented using textual data. In some embodiments, representation generation module 210 generates representations of data describing items or POS data from databases (e.g., source database 121 of enterprise or system-managed databases that may be stored locally or on an external server). Representation generation module 210 may communicate with other components of the enterprise data management system 130 to provide representations of data usable by the other components for performing one or more processes. For instance, representation generation module 210 may provide representations of data usable for applying a machine learning model to the data, as described in greater detail below with reference to FIGS. 3A and 3B.

In some embodiments, representation generation module 210 extracts item descriptors from images. For instance, representation generation module 210 may receive an image of a paper receipt describing a customer transaction relating to an item of an enterprise. In this case, representation generation module 210 may extract a textual item descriptor for the item from the image of the receipt. Representation generation module 210 may use various techniques to extract item descriptors from images, such as one or more machine-learning or geometric-based computer visions techniques suitable for extracting text from images.

Item descriptor normalization module 220 determines one or more normalized item descriptors that are possible matches for a non-normalized item descriptor, referred to herein as "candidate" item descriptors. In particular, item descriptor normalization module 220 determines normalized item descriptors that are standardized without respect to any particular enterprise (e.g., an enterprise catalog), but are instead generally normalized relative to universal formats. Item descriptor normalization module 220 may receive or otherwise obtain non-normalized item descriptors from a variety of sources, such as from POS or inventory data of one or more enterprises (e.g., enterprise 120). The item descriptors processed or otherwise used by item descriptor normalization module 220 may be represented using one or more representations generated by representation generation module 210, as described above. Additionally, or alternatively, item descriptor normalization module 220 determines one or more context categories for a non-normalized item descriptor related to a product domain (e.g., food, household items, electronics, toys, etc.) The product domain may be determined by item descriptor normalization module 220 (e.g., based on metadata associated with a non-normalized item descriptor) or may be provided or otherwise configured by administrators of an enterprise that provided the non-normalized item descriptor. Context categories for an item descriptor (e.g., non-normalized or normalized) may indicate properties of the item descriptor overall, properties of individual terms of the item descriptor (e.g., individual words), relationships between the item descriptor and other item descriptors, or some combination thereof. Item descriptor normalization module 220 may determine the one or more candidate item descriptors or context categories for the non-normalized item descriptor using one or more unsupervised machine learning models, as described in greater detail below with references to FIG. 3A.

Among other advantages, by determining one or more normalized item descriptors for non-normalized item descriptors without respect to any particular enterprise, the process performed by item descriptor normalization module 220 can be generalized to process non-normalized item descriptors for various different enterprises, domains, or contexts. Furthermore, the process performed by item descriptor normalization module 220 can be scaled to a generalized computing environment including many different client systems (e.g., different enterprises).

In embodiments where a given non-normalized item descriptor includes a set of characters (e.g., letters), item descriptor normalization module 220 determines a set of candidate normalized item descriptors for a non-normalized item descriptor by performing a character infilling process on the non-normalized item descriptor using the set of characters. The character infilling process includes identifying possible characters for insertion between adjacent characters in the non-normalized descriptor in order to form a normalized item descriptor. For example, if item descriptor normalization module 220 receives a non-normalized item descriptor "btr chkn," the character infilling process may determine the normalized item descriptors "butter chicken" or "batter chicken."

Item descriptor normalization model 220 may perform the character infilling process using data corresponding to a domain or other context associated with a received non-normalized item descriptor, referred to herein as "context data." Item descriptor normalization module 220 may store context data in a database (e.g., database 250) or may obtain context data from one or more other sources (e.g., a third-party provider of context data). As an example, if the non-normalized item descriptor is associated with a food-related domain (e.g., food ingredients or products), item descriptor normalization module 220 may use a set of data including recipe or other food-related data to perform the character infilling process. Such recipe or food-related data may associate food item descriptors with various food categories, e.g., chicken corresponds to "meat," burrito corresponds to "meal" or "sandwich," and so on. In cases where context data is used, item descriptor normalization module 220 may use context data to train a character infilling machine learning model, as described in greater detail below with reference to FIG. 3A. Among other advantages, by using context data item descriptor normalization model 220 improves efficiency and reduces computation cost for determining candidate item descriptors, e.g., by avoiding consideration of candidate item descriptors that correspond to an irrelevant context.

In the same or different embodiments, after determining a set of candidate normalized item descriptors for a non-normalized item descriptor, item descriptor normalization module 220 performs a category assignment process on the set of candidate normalized item descriptors to determine one or more context categories corresponding to the candidate normalized item descriptors. Item descriptor normalization module 220 may use the assignment process to remove or otherwise identify candidate normalized item descriptors that are unlikely to match the non-normalized descriptor based on one or more determined context categories. Similarly, item descriptor normalization module 220 may use the category assignment process to identify or otherwise flag candidate item descriptors that are likely to match the non-normalized item descriptor based on one or more determined context categories. For instance, continuing with the above example, if the candidate normalized descriptors for "btr chkn" include "butter chicken" and "batter chicken," item descriptor normalization module 220 may assign a category "meal component" to "butter" and "chicken" but assign a category "raw ingredient" to "batter." Based on these categories, item descriptor normalization module 220, may determine that "butter chicken" has a first probability of matching "btr chkn" based on the terms "butter" and "chicken" being assigned to the same category" and a second probability of "batter chicken" matching "btr chkn" based on the terms "batter" and "chicken" being assigned to different categories, where the first probability is higher than the second probability.

Based on the category assignment process item descriptor normalization module 220 may assign one or more classifications to the set of candidate normalized item descriptors (e.g., "likely to match," "unlikely to match," etc.) or may assign a sliding scale of values indicative of a probability of a candidate normalized item descriptor matching the non-normalized descriptor. In some embodiments, item descriptor normalization module 220 removes candidate item descriptors from a set of candidate item descriptors that have a probability of matching a non-normalized item descriptor below a threshold. Particular embodiments of the category assignment process performed by item descriptor normalization module 220 are described in greater detail below with reference to FIG. 3A.

In some embodiments, item descriptor normalization module 220 uses a domain-specific knowledge base to perform the category assignment process. The domain-specific knowledge base may be a knowledge graph that organizes normalized item descriptors according to a hierarchy of categories, relationships, or both. In particular, the knowledge graph may include a set of nodes representing categories connecting to sub-nodes representing subcategories or normalized item descriptors. The nodes and sub-nodes may be connected by edges having associated positive or negative weights indicative of a characteristic of the relationship between a given node and sub-node. For example, a positive weight may indicate a node and a sub-node have a positive correlation and a negative weigh may indicate a node and a sub-node have a negative correlation. A size of a weight may by indicative of a proportional importance of an edge relative to other edges connected to a node or sub-node. The nodes, sub-nodes, and weights of a knowledge graph may be initialized through configuration by a human administrator (e.g., an administrator of enterprise data management system 130 or enterprise 120). Additionally, or alternatively, elements of the knowledge graph may be updated periodically, e.g., based on new data or user actions. For example, a user of enterprise data management system 130 may approve or reject a relationship between a normalized item descriptor and a context category within the knowledge graph, such as by using an interface similar to the interface described below in relation to FIG. 4.

In some embodiments, item descriptor normalization module 220 uses a triplestore (also referred to as a "resource description framework" (RDF) database) to perform the category assignment process. In this case, item descriptor normalization model 220 can perform semantic queries on the triplestore using terms included in a candidate normalized item descriptor to determine one or more context categories. For example, item descriptor normalization module may perform semantic queries on the triplestore for each term included in a normalized item descriptor in order to determine context categories or other information. In this case, item descriptor normalization module 220 may compare results of the semantic queries for each term of a normalized item descriptor in order to determine if the normalized item descriptor corresponds to a particular context category overall or if individual terms of the normalized item descriptor correspond to the same context category or not. The triplestore may be configured to be used for a particular domain associated with the non-normalized item descriptor (e.g., food ingredients or products). As an example, item descriptor normalization module 220 may use the DBpedia triplestore to perform the verification process.

Enterprise catalog matching module 230 matches non-normalized item descriptors to one or more normalized item descriptors included in an enterprise catalog of an enterprise (e.g., enterprise 120). For instance, enterprise catalog matching module 230 may determine a particular term used by an enterprise to describe an item (e.g., a food item). Enterprise catalog matching module 230 may match a non-normalized item descriptor to normalized item descriptors included in an enterprise catalog using a set of candidate item descriptors for the non-normalized item descriptor. For instance, enterprise catalog matching module 230 may receive a set of candidate item descriptors for a non-normalized item descriptor from item descriptor normalization module 220. In this way, enterprise catalog matching module 230 may narrow down a set of candidate item descriptors for a non-normalized item descriptor to a particular item descriptor used by an enterprise to describe an item. Enterprise catalog matching module 230 may match candidate item descriptors to normalized item descriptors in an enterprise catalog by determining a probability that the candidate item descriptor matches normalized item descriptor or groups of normalized item descriptors included in the enterprise catalog. Matching may be performed by enterprise catalog matching module 230 using one or more supervised machine learning models, as described in greater detail below with references to FIG. 3B.

Matched item descriptor processing module 240 process information corresponding to matched pairs of non-normalized item descriptors and normalized item descriptors, referred to herein as "shorthand-catalog pairs." For instance, matched item descriptor processing module 240 may receive a non-normalized item descriptor and an identifier of a matching normalized item descriptor from an enterprise catalog determined by enterprise catalog matching module 230. Datasets generated using shorthand-catalog pairs may include shorthand-catalog pairs corresponding to data for a particular enterprise (e.g., enterprise 120), or may include shorthand-catalog pairs corresponding to data from multiple enterprises or other data sources. Additionally, matched item descriptor processing module 240 may combine shorthand-catalog pairs with other data (e.g., customer data).

Matched item descriptor processing module 240 may further use datasets of shorthand-catalog pairs for analyses of enterprise data, which may be used to generate interfaces (e.g., data visualizations or dashboards), product recommendations, or other information. Matched item descriptor processing module 240 may further provide analyses of data including shorthand-catalog pairs to one or more computing devices, such as electronic devices 122 or client devices 140. An example embodiment of a data analytics dashboard generated by enterprise data management system 130 is described in greater detail below with reference to FIG. 4.

In some embodiments, matched item descriptor processing module 240 generates datasets for training machine learning models using shorthand-catalog pairs. For example, matched item descriptor processing module 240 may generate a training data set of non-normalized item descriptors labeled with correct or incorrect matching normalized item descriptors. In this case, matched item descriptor processing module 240 may use the training dataset to train a machine learning model to directly predict normalized item descriptors in an enterprise catalog given an input non-normalized descriptor without, e.g., determining context categories or verifying candidate normalized item descriptors, as described above with reference to item descriptor normalization module 220.

In the same or different embodiments, matched item descriptor processing module 240 may use shorthand-catalog pairs for a customer product recommendation engine. In particular, matched item descriptor processing module 240 may determine shorthand-catalog pairs for non-normalized item descriptors in POS data corresponding to customer transactions. In this case, matched item descriptor processing module 240 may combine shorthand-catalog pairs with other data from the corresponding POS data in order to infer transaction habits for one or more customers. For example, matched item descriptor processing module 240 may calculate affinity scores for pairs of customers and products in an enterprise catalog using the combined dataset of shorthand-catalog pairs and transaction data, affinity scores indicative of a customer's relationship with one or more products (e.g., a degree at which they would likely purchase the product). Matched item descriptor processing module 240 may use affinity scores or other relevant values in order to provide recommendations to customers to buy corresponding products (e.g., via a notification or other message displayed on client devices 140). Examples of determining affinity scores for product items are described in greater detail in co-pending U.S. patent application Ser. No. 16/741,594, filed Jan. 13, 2020, which is hereby incorporated by reference in its entirety.

Database 250 is a database storing data corresponding to one or more enterprises (e.g., enterprise 120) used by enterprise data management system 130. For instance, database 250 may include inventory data, POS data, or customer data provided to enterprise data management system 130 by enterprises that use services of enterprise data management system 130. Enterprise data may be provided to enterprise data management system 130 using one or more computing devices, such as electronic devices 122 or client devices 140.

Figure 3A:
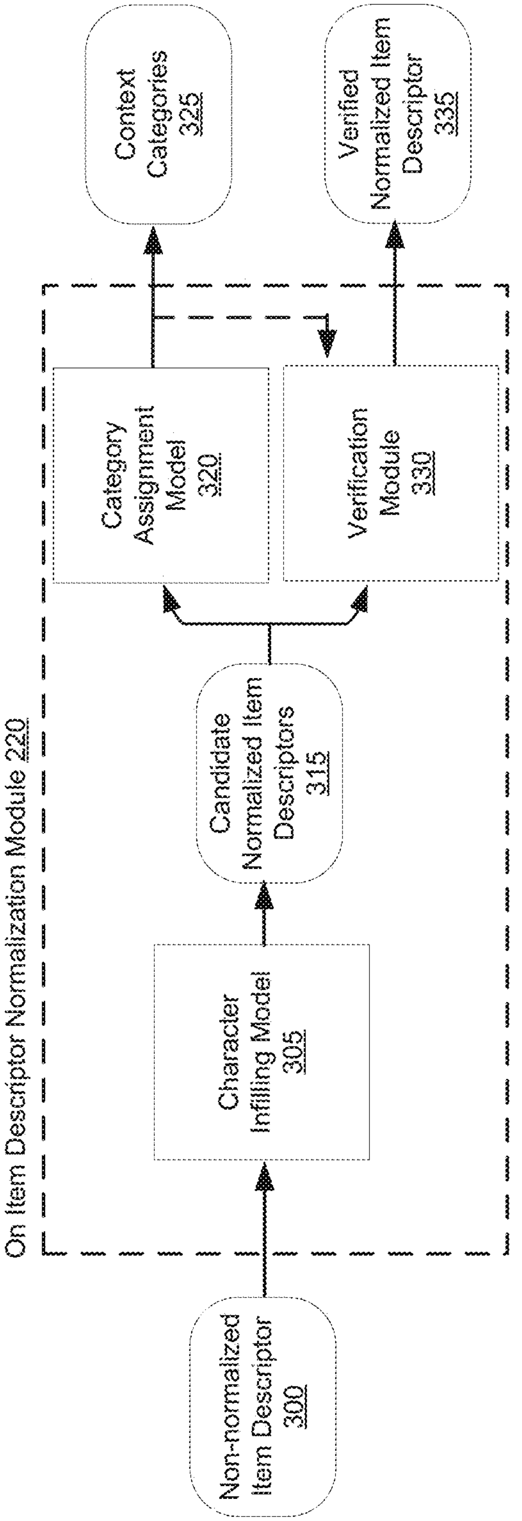
FIGS. 3A and 3B are flow diagrams illustrating techniques for processing non-normalized item descriptors, according to at least one embodiment.
Figure 3B:
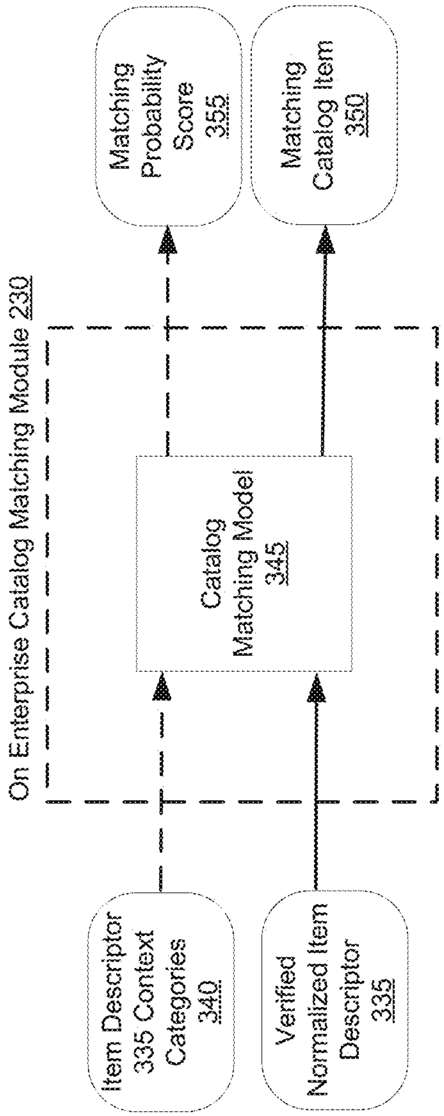

FIGS. 3A and 3B illustrate embodiments of machine-learning techniques for processing non-normalized item descriptors. In the same or different embodiments than those described, machine learning models used may employ various algorithms including neural networks (e.g., feed-forward neural networks, convolutional neural networks, recurrent neural networks, etc.), linear classifiers (e.g., logistic regression, Naïve Bayes, etc.), support vector machines, kernel estimation, decision trees, and any other appropriate techniques. Furthermore, the models used to perform a variety of machine learning tasks, such as classification, reinforcement learning, dimensionality reduction, clustering, or regression. Additionally, as described in greater detail below, the machine learning models may be trained using supervised learning techniques, unsupervised learning techniques, or some combination thereof. The machine learning models may be trained by the enterprise data management system 130 or another suitable system or entity.

FIG. 3A is a flow diagram illustrating an embodiment of a process performed by item descriptor normalization module 220 to determine a normalized item descriptor for a non-normalized item descriptor. In the embodiment shown, item descriptor normalization module 220 uses character infilling model 305, category assignment model 320, and verification module 330. In other embodiments, fewer, additional, or different models, modules, or training processes may be used.

As depicted in FIG. 3A, character infilling model 305 receives non-normalized item descriptor 300 as input. For example, non-normalized item descriptor 300 may be included in a set of POS or inventory data stored in database 250. Character infilling model 305 processes one or more characters included in non-normalized item descriptor 300 in order to output candidate normalized item descriptors 315 including one or more characters inserted between adjacent characters in the non-normalized item descriptor 300. Characters infilling module 305 may be a natural-language processing model configured to process item descriptors corresponding to a language-based representation (e.g., English words).

In some embodiments, character infilling model 305 is trained (e.g., by the enterprise data management system 130) using a supervised learning process. In particular, character infilling model 305 may be trained using a training dataset of non-normalized item descriptors labeled with corresponding normalized item descriptors for a particular domain (e.g., food). In this case, character infilling model 305 may be trained on the training dataset using various supervised learning techniques to predict characters for insertion between adjacent characters in a non-normalized item descriptor to achieve the normalized item descriptor. After character infilling model 305 has been trained using supervised techniques, character infilling model 305 predicts characters for insertion between adjacent characters in non-normalized item descriptor 300 in order to output candidate normalized item descriptors 315. For example, character infilling module 305 may determine the candidate item descriptor "butter chicken" for input non-normalized item descriptors "btr chkn," bt chkn," butr chkn," and "btr ckn."" The data used to train character infilling model 305 may additionally, or alternatively, include various context data corresponding to a particular domain.

In some embodiments, character infilling model 305 is a probabilistic classification model that predicts conditional probabilities of candidate normalized item descriptors corresponding to non-normalized item descriptor 300. For example, character infilling model 305 may be a naïve bayes classifier trained using one or more supervised or unsupervised naïve bayes learning algorithms. In this case, character infilling model 305 may be trained to predict conditional probabilities that a character should be inserted between adjacent characters for a given input non-normalized item descriptor. In other embodiments, character infilling model 305 may be a probabilistic classification model trained using one or more other training techniques suitable for determining candidate normalized item descriptors for an input non-normalized item descriptor.

In the same or different embodiments, character infilling model 305 is a noisy channel model. In this case, character infilling model 305 interprets non-normalized item descriptor 300 as a malformed item descriptor (e.g., a misspelled word or set of words) where a correctly formatted item descriptor has been distorted by being passed through a noisy communication channel. For example, noise may be character substitutions or other changes to characters of a normalized item descriptor. In some embodiments, the noisy channel model includes multiple different language models trained using different datasets or for different tasks. As an exemplary case, the noisy channel model may include a first language model and a second language model. The first language model is trained using a non-domain specific dataset of malformed item descriptors to predict normalized item descriptors representing correctly formatted versions of the malformed item descriptors (e.g., correctly spelled words). The second language model is trained using a dataset corresponding to a particular domain, such as a domain corresponding to non-normalized item descriptor 310 (e.g., recipe or food data), to predict normalized item descriptors relevant to the domain. The noisy channel model may compare or otherwise process the outputs of the first and second language models in order to determine candidate normalized item descriptors 315. For example, the noisy channel model may select normalized item descriptors included in the outputs of both the first model and the second model to include in candidate normalized item descriptors 315.

As further depicted in FIG. 3A, category assignment model 320 receives candidate normalized item descriptors 315 and outputs context categories 325 for candidate normalized item descriptors 315. Context categories 325 may include an overall context category for individual candidate normalized item descriptors 315, categories for individual terms included in candidate normalized item descriptors 315, or some combination thereof. In some embodiments, category assignment model 320 outputs a set of context subcategories for a candidate normalized item descriptor that are used (e.g., by item descriptor normalization module 220) to determine an overall parent context category for a candidate item descriptor. For instance, category assignment model 320 may output scores for each context subcategory in a set of output context subcategories that are used to select the parent context category, such as the context subcategory having the highest score. Category assignment model 320 is configured to group individual candidate normalized item descriptors or terms into learned clusters of non-normalized item descriptors or non-normalized item descriptor terms that correspond to context categories. For example, if candidate normalized item descriptors include “butter chicken” and “batter chicken,” then category assignment module 320 may cluster “butter chicken” and “batter chicken” according to a “main ingredient” context category. In this case, both “butter chicken” and “batter chicken” may be assigned to a “chicken” main ingredient context category.

In some embodiments, category assignment model 320 is a machine learning model trained using unsupervised machine learning training techniques. In this case, category assignment model 320 may be trained using a training dataset including normalized item descriptors and context data, wherein category assignment model 320 learns clusters of the normalized item descriptors corresponding to different context categories through the unsupervised training process. After category assignment model 320 has been trained using unsupervised techniques, category assignment model 320 classifies an input normalized item descriptor into one or more of the learned clusters in order to output context categories for the normalized item descriptor. Various unsupervised learning techniques may be used to train category assignment model 320, such as various clustering techniques (e.g., hierarchical clustering, K-means clustering, K nearest neighbors, principal component analysis, singular value decomposition, independent component analysis). Alternatively, or additionally, category assignment model 320 may be a knowledge base (e.g., a knowledge graph or triplestore), which is used to determine context categories for candidate normalized item descriptors 315, as described above with reference to item descriptor normalization module 220. In this case, the knowledge base may be generated using unsupervised machine learning techniques, as described above.

Verification module 330 performs a verification process on candidate normalized item descriptors 315 to select candidate normalized item descriptors having a likelihood of matching non-normalized item descriptor 300 that meet verification threshold criteria, referred to herein as “verified normalized item descriptors.” As depicted in FIG. 3A, verification module 330 receives candidate normalized item descriptors 315 and outputs verified normalized item descriptor 335. Although only a single verified normalized item descriptor 335 is depicted in FIG. 3A, in the same or different embodiments verification module 330 may output any number of verified normalized item descriptors from candidate normalized item descriptors 330. Verification module 330 may flag or otherwise remove candidate normalized item descriptors 315 with likelihoods of matching non-normalized item descriptor 300 that do not meet the verification threshold criteria. As such, verification module 330 may improve computation efficient for the processes described in relation to FIGS. 3A-3B by preventing unnecessary processing of candidate normalized item descriptors 315 that are verified.

Verification module 330 determines verified normalized item descriptor 335 by comparing candidate normalized item descriptors 315 to a set of information indicative of whether normalized item descriptors are likely to match a corresponding non-normalized item descriptor, referred to herein as “verification information.” Verification information used by verification model 340 may include a domain-specific knowledge base or triplestore, as described above with reference to item descriptor normalization module 220. Verification model 340 uses verification information to determine likelihoods of candidate normalized item descriptors matching non-normalized item descriptor 300, where a likelihood may be represented as a classification value, a probability value, or any other suitable value for each of candidate normalized item descriptors 315 indicative of a likelihood that a given candidate normalized item descriptor matches non-normalized item descriptor 310. Verification module 330 may apply various verification threshold criteria to likelihoods determined for candidate normalized item descriptors to identify verified normalized item descriptors. As an example, a verification threshold criterion may specify selecting the candidate normalized item descriptor having the highest likelihood of matching non-normalized item descriptor 310 relative to the other candidate normalized item descriptors. As another example, verification threshold criteria may include selecting candidate normalized item descriptors from the candidate normalized item descriptors 315 that have a particular classification value or a probability value exceeding a threshold probability.

As indicated by the dashed arrow, verification module 330 may receive context categories 325 to use for determining verified normalized item descriptor 335. For instance, if non-normalized item descriptor 310 is associated with food items, then the verification information may include context categories relating to different types of food items. As an example, if non-normalized item descriptor 310 is “btr chkn” and candidate normalized item descriptors 330 include “butter chicken” and “batter chicken,” verification module 330 may determine that “butter” and “chicken” correspond to a category “meal component” and “batter” corresponds to a category “raw ingredient.” Verification module 330 may use such context categories 315 to determine a likelihood of candidate normalized item descriptors matching non-normalized item descriptor 300.

In the same or different embodiments, verification module 330 uses semantics information to determine verified normalized item descriptor 335, such as combinations of terms that are typically found together in normalized item descriptors. Continuing with the above example, if non-normalized item descriptor 310 is "btr chkn" and candidate normalized item descriptors 330 include "butter chicken" and "batter chicken," verification model 340 may determine that "butter chicken" is included in the semantics information but "batter chicken" is not. Verification module 330 may use such semantic information to determine a likelihood of candidate normalized item descriptors 315 matching non-normalized item descriptor 300.

In some embodiments, verification module 330 determines verified normalized item descriptor 330 by applying constraints or other criteria to candidate normalized item descriptors 315. For instance, verification module 330 may determine a likelihood of a given candidate normalized item descriptor matching by applying constraints to verify if the given candidate normalized item descriptor corresponds to a particular context category or domain (e.g., using context categories 325). As another example, verification module 330 may determine the likelihood by applying constraints to determine if terms of the candidate normalized item descriptor corresponds to the same or different context categories.

In some embodiments, verification module 330 uses a machine learning model trained to predict a likelihood that candidate normalized item descriptors 315 match non-normalized item descriptor 300. For instance, verification module 340 may use a language model that determines a likelihood that words representing a candidate normalized item descriptor are properly formatted generally or would be used to represent non-normalized item descriptor 300 in particular. In such cases, the machine learning model used by verification module 330 may be trained using unsupervised machine learning techniques, such as those described above with reference to category assignment model 320-. For example, the model used by verification module 330 may learn clusters of normalized item descriptors that can be used to categorize candidate normalized item descriptors (e.g., as verified or rejected). Alternatively, or additionally, verification module 330 may be trained using supervised or semi-supervised machine learning techniques.

FIG. 3B is a flow diagram illustrating an embodiment of a process performed by enterprise catalog matching module 230 to determine a catalog item in an enterprise catalog matching verified normalized item descriptor 335 (and, by extension, matching non-normalized item descriptor 300). In the embodiment shown, enterprise catalog matching module 230 uses catalog matching model 345. In other embodiments, fewer, additional, or different models or training processes may be used.

As depicted in FIG. 3B, catalog matching model 345 receives verified normalized item descriptor 335, such as output by verification module 330. As indicated by the dashed arrow, catalog matching model 345 may also receive item descriptor 335 context categories 340 as input, such as output by category assignment model 320. Item descriptor 335 context categories are context categories particularly corresponding to verified normalized item descriptor 335. Catalog matching model 345 is a machine-learning classification model trained to classify normalized item descriptors as one or more matching items included in a particular enterprise catalog, such an enterprise catalog of enterprise 120. Catalog matching model 345 is trained through a supervised learning process using data corresponding to the relevant enterprise catalog or the relevant enterprise (e.g., enterprise metadata). For example, if the enterprise catalog corresponds to a restaurant enterprise, catalog matching model 345 may be trained using a training data set including normalized item descriptors labeled as items from a menu of the restaurant, such as the particular terms used to describe the items or categories including the items on the menu. Catalog matching model 345 outputs matching catalog item 350 that classified as matching verified normalized item descriptor 335. As indicated by the dashed line, catalog matching model may additionally output matching probability score 335 indicating a probability that matching catalog item 350 matches verified normalized item descriptor 335. For instance, if verifies normalized item descriptor 335 is "butter chicken" and the enterprise catalog corresponds to a restaurant, matching catalog item 350 may be a particular name for "butter chicken" on a menu of the restaurant (e.g., "Spicy Butter Chicken").

In embodiments where catalog matching model 345 receives normalized item descriptor context categories as input (e.g., item descriptor 335 context categories 340), catalog matching model 345 may be trained using a training dataset including pairs of normalized item descriptors and corresponding item descriptor categories labeled with a matching enterprise catalog item, wherein catalog matching model 345 learns to classify the normalized item descriptors and corresponding categories according to the matching enterprise catalog item labels through the supervised training process. After catalog matching model 345 has been trained using supervised training techniques, catalog matching model 345 outputs classifications for input normalized item descriptors (and input categories if applicable) as one or more matching enterprise catalog items If catalog matching model 345 receives context categories as input, catalog matching model 345 may account for instances of normalized item descriptor terms used for different context categories. For example, a first normalized item descriptor may be "sour cream" having a first context category "topping" and a second normalized item descriptor may be "ice cream" having a second context category "desert." In this case, the catalog matching module 370 can use the first and second context categories to more accurately predict matching first and second catalog items, such as a particular sour cream product or ice cream product in the relevant enterprise catalog. Various supervised techniques may be used to train catalog matching model 345, such as neural networks, linear classifiers, support vector machines, kernel estimation, decision trees, or any other suitable technique.

In some embodiments, catalog matching model 345 is trained (e.g., by enterprise catalog matching model) using a training pipeline that includes performing the processes described above in relation to FIG. 3A on non-normalized item descriptors to generate normalized item descriptor training samples. Non-normalized item descriptors used to train catalog matching model 345 or any other machine learning models described herein may be derived from data corresponding to one or more enterprises or may be generated synthetically using a non-normalized item descriptor generation process.

As described above with reference to matched item descriptor processing module 240, matching catalog item 350 or matching probability score 355 determined for non-normalized item descriptor 310 may be used for a variety of processes. For instance, non-normalized item descriptor 300 and matching catalog item 350 may be used to generate a training dataset for training one or more supervised or unsupervised machine learning models.

Using the techniques described above in relation to FIGS. 3A and 3B, the enterprise data management system 130 can advantageously match non-normalized item descriptors to items of a particular enterprise. In doing so, among other advantages, enterprise data management system 130 enables shorthand, informal or otherwise non-standardized representations of items corresponding to data of the enterprise (e.g., POS data or inventory data) having different domains, contexts, or formatting to be matched to standardized representations for individual enterprises. As such, the techniques described above in relation to FIGS. 3A and 3B can be scaled or generalized for use by any number of different enterprises. Furthermore, by using models that are trained without reference to any particular enterprise to perform the processes described in FIG. 3A (e.g., using unsupervised techniques), enterprise data management system 130 can advantageously match unanticipated non-normalized item descriptors to enterprise catalog items.

Exemplary Data Analytics Dashboard

Figure 4:
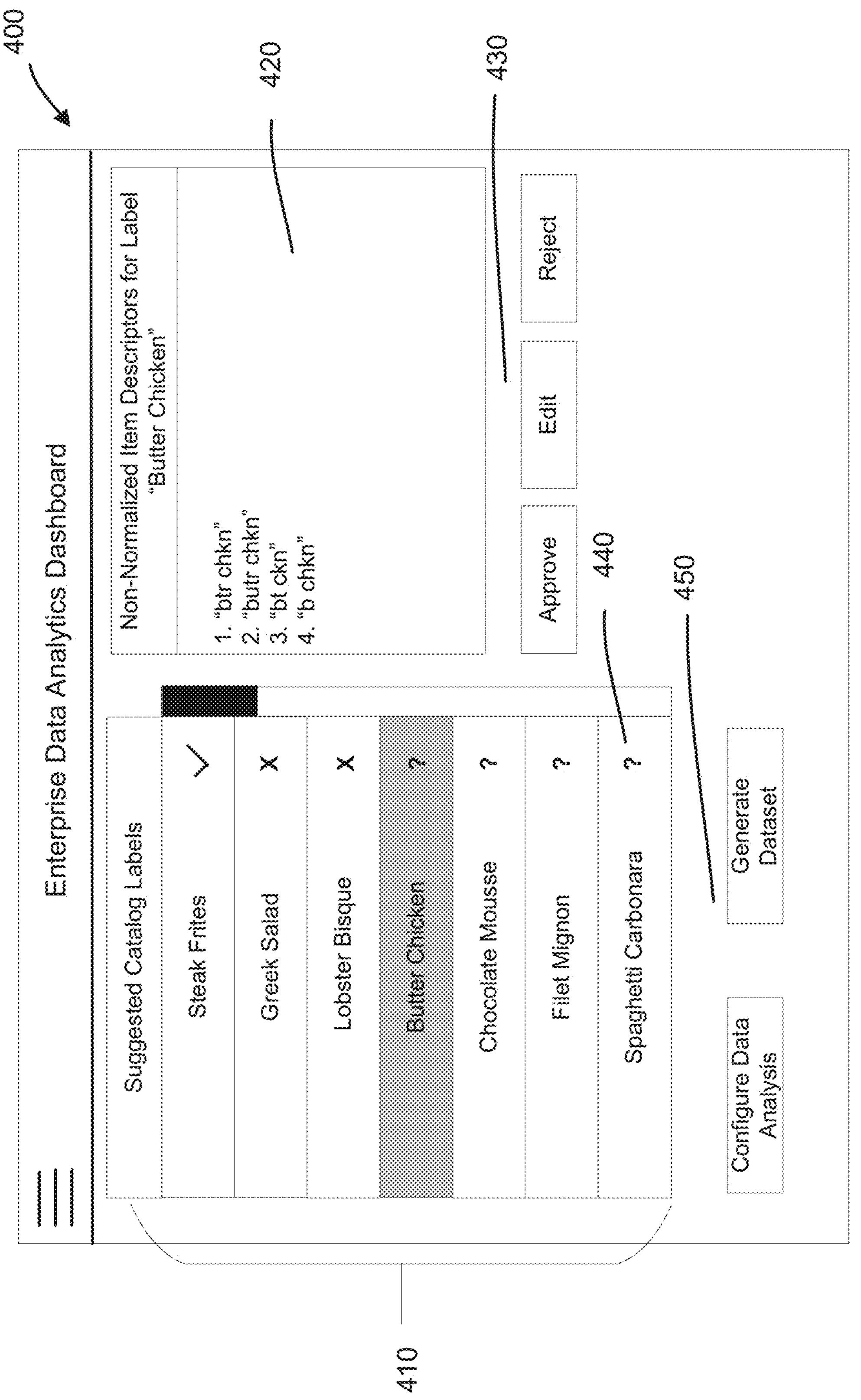
FIG. 4 depicts a graphical user interfaces (GUI) for review of suggested enterprise catalog classification labels for non-normalized item descriptors determined by the enterprise data management system of FIG. 1, according to at least one embodiment.

FIG. 4 depicts an embodiment of a graphical user interfaces (GUI) for review of suggested enterprise catalog classification labels for non-normalized item descriptors determined by enterprise data management system 130 of FIG. 1. In the embodiment shown, GUI 400 is an enterprise data analytics dashboard, such as a client-side interface for accessing data analytics services provided by enterprise data management system 130, e.g., by providing GUI 400 for display on electronic devices 122 or client devices 140. GUI 400 may correspond to a dashboard configured by enterprise data management system 130 for a profile of a particular enterprise (e.g., enterprise 120).

As depicted in FIG. 4, GUI 400 includes a set of suggested catalog labels 410 or non-normalized item descriptors relating to an enterprise catalog in a food-related domain, such as an enterprise catalog corresponding to a restaurant. GUI 400 enables a user to review suggested catalog labels 410 and take one or more actions. Enterprise data management system 130 may derive the set of suggested catalog labels 410 from an enterprise catalog data set provided to enterprise data management system 130 by an enterprise (e.g., enterprise 120). The set of suggested catalog labels 410 provided by enterprise data management system 130 for user review via GUI 400 after analyzing a set of non-normalized item descriptors in relation to the enterprise catalog. For instance, enterprise data management system 130 may analyze the non-normalized item descriptors using one or more processes for matching non-normalized item descriptors to normalized item descriptors described above in relation to FIGS. 2-3.

Suggested catalog labels 410 are associated with respective groups of non-normalized item descriptors assigned to the corresponding suggested catalog label by enterprise data management system 410. In FIG. 4 GUI 400 includes a suggested catalog label 410 for “Butter Chicken” that is currently selected (as indicated by the grey highlight) and non-normalized item descriptor group 420 displayed based on the selection. As described above in relation to FIG. 3, enterprise data management system 130 may assign groups of non-normalized item descriptors 420 to the suggested catalog label “butter chicken” by inputting each of the non-normalized item descriptors into a machine learning pipeline including one or more models that classify the non-normalized item descriptors as one or more enterprise catalog items.

GUI 400 includes a set of user actions 430 configured to receive user input for taking one or more actions in relation to the suggested assignment of non-normalized item descriptor group 420. In particular, based on their review, the user may approve or reject “Butter Chicken” as a label for the non-normalized item descriptor groups 420 using user actions 430. Alternatively, the user may edit the suggested label or non-normalized item descriptor group 420 using user actions 430. For example, the user may add or remove a non-normalized item descriptor from item descriptor group 420.

GUI 400 includes a user input status 420 for each suggested catalog label 410 indicating an action taken by the user with respect to the suggested catalog label using user actions 430. The user input statuses 420 include an approved status (as indicated by the check mark symbol), a rejected status (as indicated by the “X” symbol), and a pending status (as indicated by the “?” symbol).

GUI 400 further includes an additional set of user actions 450 configured to receive user input for configuring the overall data analysis of the set of non-normalized item descriptors and to use the suggested catalog labels to generate a dataset. As an example of configuring the overall data analysis, the user may reconfigure or reperform the analysis to use additional or different non-normalized item descriptors or catalog labels, or adjust one or more parameters used by enterprise data management system 130 to perform the analysis. In this case, enterprise data management system 130 may account for user actions 430 taken with respect to non-normalized item descriptor groups for suggested catalog labels 410 in configuring the overall data analysis, e.g., by adjusting parameters used by one or more models of enterprise data management system 130. For instance, enterprise data management system 130 may adjust weights associated with edges in a knowledge graph used to determine context categories for normalized item descriptors, as described above with reference to FIGS. 2 and 3A. In this case, weights may be adjusted to indicate a more positive correlation between nodes and sub-nodes if a user approves of a suggested label for a non-normalized item descriptor group, or alternatively weights may be adjusted to indicate a less positive correlation or a more negative correlation if a user rejects a suggested label for a non-normalized object descriptor group. As an example of generating a dataset, enterprise data management system 130 may generate a training data set using suggested catalog labels and corresponding groups of non-normalized item descriptors that were approved by the user. As described above with reference to matched item descriptor processing module 240, the generated dataset may be used for a variety of purposes, e.g., to train a machine learning model. The dataset may also be used to retrain one or more models used by enterprise data management system 130 to classify non-normalized item descriptors, as described above with reference to configuring the overall data analysis.

Computing Machine Architecture

Figure 5:
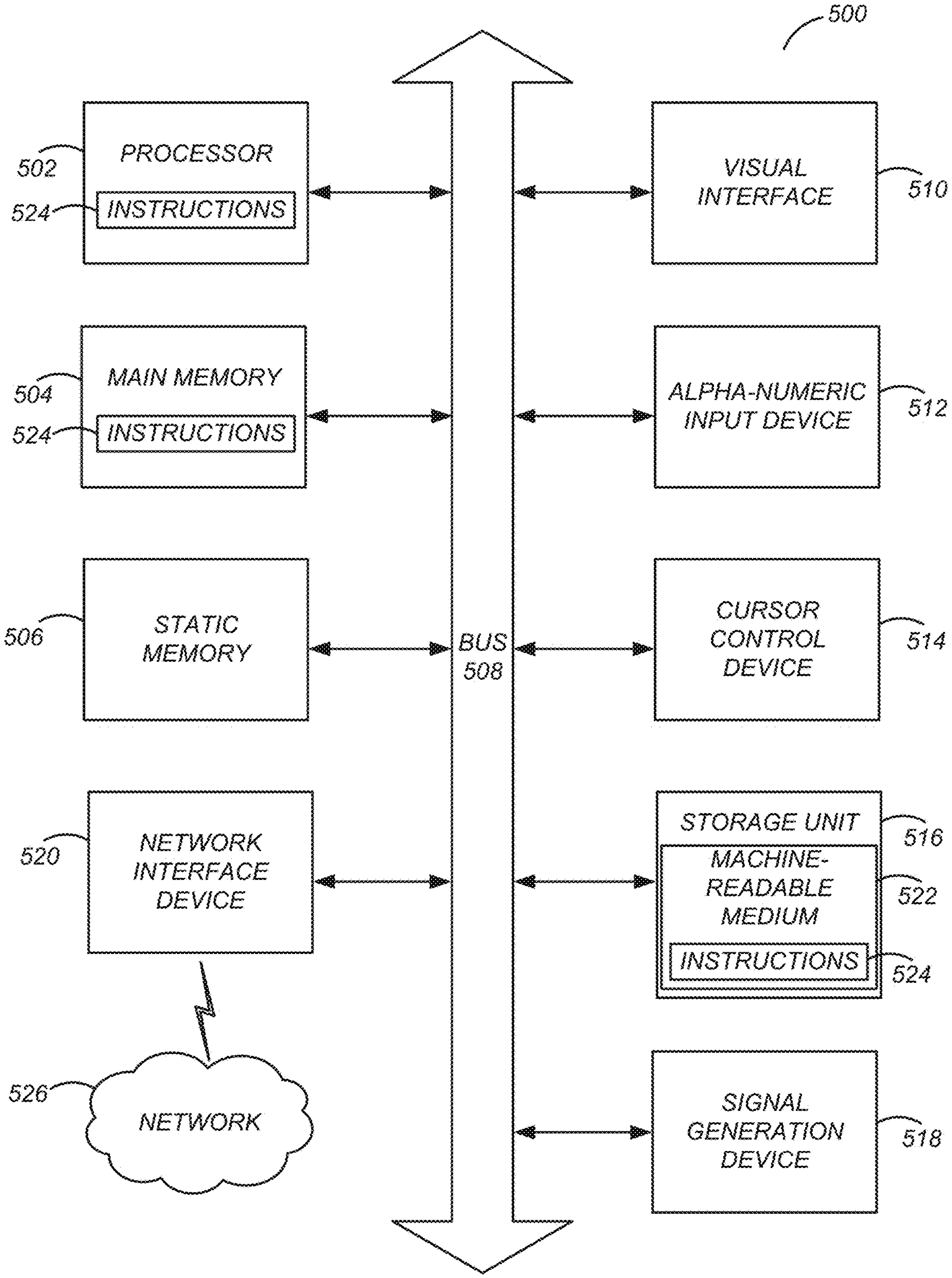
FIG. 5 shows a diagrammatic representation of a computer system for implementing the inventory catalog management system of FIG. 1, according to at least one embodiment.

FIG. (FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Process for Classifying Shorthand Item Descriptors

Figure 6:
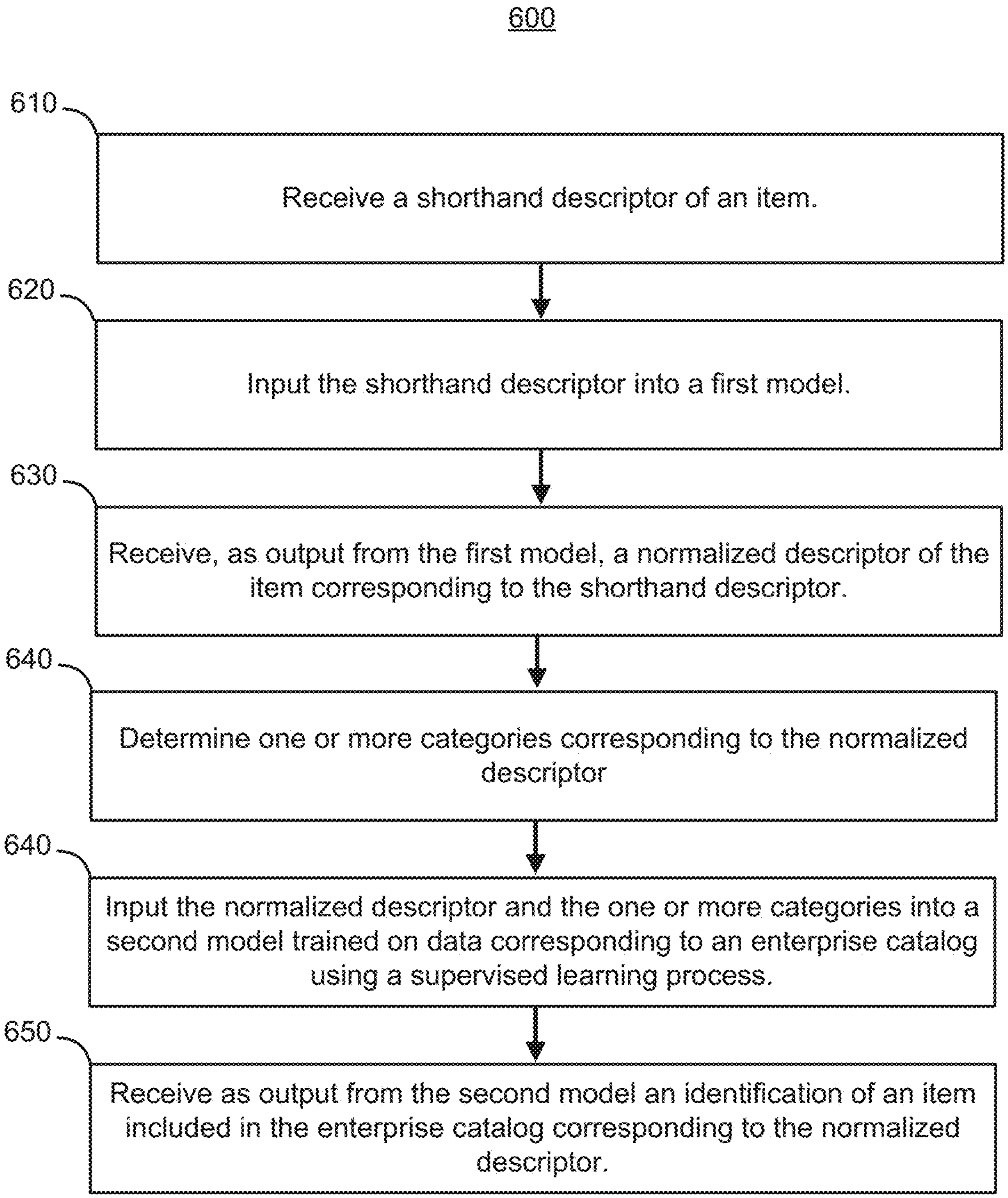
FIG. 6 is a flowchart illustrating a process for classifying a shorthand item descriptor in accordance with an enterprise catalog, according to at least one embodiment.

FIG. 6 is a flowchart illustrating an embodiment of a process 600 for classifying a shorthand item descriptor in accordance with an enterprise catalog. In the embodiment shown, the steps of the process 600 are performed by certain components of enterprise data management system 130 depicted in FIG. 1. In other embodiments, the steps of the process 600 may be accomplished by other suitable components, e.g., of the computer environment 100, than those depicted in FIG. 6 and described below.

Enterprise data management system 130 receives 610 a shorthand descriptor of an item. For example, item descriptor normalization module 220 of enterprise data management system 130 receives a non-normalized item descriptor from POS data stored in source database 121 of enterprise 120.

Enterprise data management system 130 inputs 620 the shorthand descriptor into first model. For example, item descriptor normalization module 220 inputs a non-normalized item descriptor into a probabilistic model configured to generate candidate normalized item descriptors including characters inserted between adjacent characters of the non-normalized item descriptor (e.g., character infilling model 305). In some cases, enterprise data management system 130 uses multiple models to process the shorthand descriptor, such as character infilling model 305 and category assignment model 320.

Enterprise data management system 130 receives 630 a normalized descriptor of the item corresponding to the shorthand descriptor as output from the first model. For example, a probabilistic model may output one or more candidate normalized item for the shorthand descriptor including the normalized item descriptor (e.g., character infilling model 305).

Enterprise data management system 130 determines 640 one or more categories corresponding to the normalized descriptor. For example, item descriptor normalization module 220 compares the normalized descriptor to a domain-specific knowledge base to determine context categories for the normalized descriptor or one or more individual terms of the normalized descriptor. Determining context categories for the normalized descriptor may additionally, or alternatively, include inputting the normalized descriptor into a model trained using an unsupervised training process (e.g., category assignment model 320). Item descriptor normalization module 220 may additionally, or alternatively, perform a verification process on the normalized descriptor, as described above with reference to FIGS. 2 and 3A.

Enterprise data management system 130 inputs the normalized descriptor and the one or more categories into a second model trained on data corresponding to an enterprise catalog using a supervised learning process. For example, matched item descriptor processing module 240 inputs the normalized descriptor and one or more categories into a supervised model trained to classify normalized item descriptors as items included in the enterprise catalog (e.g., catalog matching model 345).

Enterprise data management system 130 receives an identification of an item included in the enterprise catalog corresponding to the normalized item descriptor as output from the second model. For example, matched item descriptor processing module 240 receives the identification of the item included in the enterprise catalog as output from a supervised model trained to classify normalized item descriptors as items included in the enterprise catalog (e.g., catalog matching model 345).

Additional Configuration Considerations

Example benefits and advantages of the disclosed configurations include textual encoding to generate product recommendations from highly-variable product descriptions. The inventory catalog management system described herein receives product description data and human characteristic data and generates, using the received data, feature representations that account for both the product and customer affinities to the product.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for classifying shorthand item descriptors in accordance with an enterprise catalog through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable storage medium comprising stored instructions, the instructions when executed by one or more processors causing the one or more processors to perform a method comprising:

receiving a first descriptor of an item, the first descriptor comprising an ordered sequence of characters;

inputting the first descriptor into a first probabilistic model, the first probabilistic model configured to predict one or more characters for insertion between adjacent characters of the ordered sequence of characters;

wherein the first probabilistic model comprises a first language model corresponding to a domain configured to predict one or more first normalized item descriptors for shorthand descriptors, the one or more first normalized item descriptors comprising adjacent characters of the first descriptor and corresponding to the domain, and a second language model configured to predict one or more second normalized item descriptors for shorthand descriptors, the one or more second normalized item descriptors comprising adjacent characters of the first descriptor and corresponding to a corrected formatting of the first descriptor;

receiving a plurality of candidate item descriptors as output from the first probabilistic model, each of which correspond to the first descriptor, each candidate item descriptor comprising adjacent characters of the first descriptor and one or more characters inserted between the adjacent characters, the plurality of candidate item descriptors determined using normalized item descriptors output by the first and second language models based on the adjacent characters of the first descriptor;

identifying a candidate item descriptor with a highest probability of matching the first descriptor relative to the plurality of candidate item descriptors;

assigning the candidate item descriptor with the highest probability of matching the first descriptor as a second descriptor of the item, the second descriptor comprising the adjacent characters and one or more characters inserted adjacent in the ordered sequence; and determining, based on the second descriptor, an identification of an item of an enterprise catalog corresponding to the second descriptor.

2. The non-transitory computer readable storage medium of claim 1, wherein the method further comprises:

determining one or more categories corresponding to the second descriptor;

wherein determining the identification further comprises:

inputting the second descriptor and the one or more categories into a second model, the second model trained on item descriptors of an enterprise catalog and categories of the item descriptors; and receiving, as output from the second model, the identification of the item.

3. The non-transitory computer-readable storage medium of claim 1, wherein each plurality of candidate item descriptor output by the first probabilistic model is a normalized item descriptor having a probability of corresponding to the first descriptor that exceeds a threshold probability.

4. The non-transitory computer-readable storage medium of claim 2, wherein determining the one or more categories further comprises:

for each candidate item descriptor of the plurality of candidate item descriptors:

comparing the candidate item descriptor to a knowledge base of information corresponding to a domain; and determining, based on the comparison, one or more context categories for the candidate item descriptor.

5. The non-transitory computer-readable storage medium of claim 4, wherein the method further comprises:

for each candidate item descriptor of the plurality of candidate item descriptors:

compare the one or more context categories for the candidate item descriptor to the one or more context categories for other candidate item descriptors of the plurality of candidate item descriptors; and determining, based on the comparison of the one or more context categories, a likelihood of the candidate item descriptor matching the first descriptor; and responsive to the determined likelihood exceeding a verification threshold criterion, select the candidate item descriptor as input to the second model.

6. The non-transitory computer-readable storage medium of claim 5, wherein identifying the candidate item descriptor with the highest probability of matching the first descriptor further comprises:

determine, for each candidate item descriptor of the plurality of candidate item descriptors, a probability that the one or more context categories of the candidate item descriptor matches a context category corresponding to the first descriptor; and select the candidate item descriptor with the highest probability of matching the first descriptor as the candidate item descriptor having the highest probability that the one or more context categories of the candidate item descriptor matches the context category corresponding to the first descriptor.

7. The non-transitory computer-readable storage medium of claim 6, wherein selecting the candidate item descriptor with the highest probability of matching the first descriptor further comprises:

for a candidate item descriptor of the plurality of candidate item descriptors:

determine a first context category for a first term of the candidate item descriptor and a second context category for a second term of the candidate item descriptor; and compare the first context category and second context category to a matching context; and select the candidate item descriptor with the highest probability of matching the first descriptor based on the comparison of the first context category and second context category.

8. The non-transitory computer-readable storage medium of claim 4, wherein the knowledge base of information is a triplestore.

9. The non-transitory computer-readable storage medium of claim 4, wherein the knowledge base is an unsupervised model comprising a plurality of clusters of non-normalized item descriptors corresponding to a plurality of context categories, and wherein determining the one or more context categories further comprises:

for each candidate item descriptor of the plurality of candidate item descriptors:

input the candidate item descriptor into the unsupervised model; and receive the one or more context categories as output from the unsupervised model.

10. The non-transitory computer-readable storage medium of claim 2, wherein the second model outputs probabilities that the second descriptor corresponds to a set of items in the enterprise catalog, and wherein the method further comprises:

determine the identification of the item based on the item having a highest probability of corresponding to the second descriptor relative to other items from the set of items in the enterprise catalog.

11. The non-transitory computer-readable storage medium of claim 2, wherein the second model is trained by:

receiving a training first item descriptor;

inputting the training first item descriptor into the second model;

receiving, as output from the second model, a training second item descriptor corresponding to the first item descriptor;

determining one or more categories corresponding to the training second item descriptor; and training the second model using the training second item descriptor and the one or more categories corresponding to the training second item descriptor.

12. The non-transitory computer-readable storage medium of claim 1, wherein the instructions further comprise instructions to:

determine, using the identified item, a customer recommendation for one or more items of the enterprise catalog; and provide the customer recommendation to a client device.

13. The non-transitory computer-readable storage medium of claim 1, wherein the first descriptor is a shorthand descriptor and the second descriptor is a normalized descriptor.

14. The non-transitory computer-readable storage medium of claim 2, wherein the second model is a supervised model.

15. The non-transitory computer-readable storage medium of claim 2, wherein the second model is an unsupervised model.

16. A method for classifying shorthand item descriptors in accordance with an enterprise catalog, the method comprising:

receiving a first descriptor of an item, the first descriptor comprising an ordered sequence of characters;

inputting the first descriptor into a first probabilistic model, the first probabilistic model configured to predict one or more characters for insertion between adjacent characters of the ordered sequence of characters;

wherein the first probabilistic model comprises a first language model corresponding to a domain configured to predict one or more first normalized item descriptors for shorthand descriptors, the one more first normalized item descriptors comprising adjacent characters of the first descriptor and corresponding to the domain, and a second language model configured to predict one or more second normalized item descriptors for shorthand descriptors, the one or more second normalized item descriptors comprising adjacent characters of the first descriptor and corresponding to a corrected formatting of the first descriptor;

receiving a plurality of candidate item descriptors as output from the first probabilistic model, each of which correspond to the first descriptor, each candidate item descriptor comprising adjacent characters of the first descriptor and one or more characters inserted between the adjacent characters, the plurality of candidate item descriptors determined using normalized item descriptors output by the first and second language models based on the adjacent characters of the first descriptor;

identifying a candidate item descriptor with a highest probability of matching the first descriptor relative to the plurality of candidate item descriptors;

assigning the candidate item descriptor with the highest probability of matching the first descriptor as a second descriptor of the item, the second descriptor comprising the adjacent characters and one or more characters inserted adjacent in the ordered sequence; and determining, based on the second descriptor, an identification of an item of an enterprise catalog corresponding to the second descriptor.

17. A system for classifying shorthand descriptors in accordance with an enterprise catalog, the system comprising:

an item descriptor normalization module for receiving a first descriptor of an item, the first descriptor comprising an ordered sequence of characters;

a first probabilistic model for receiving the first descriptor as input, the first probabilistic model being configured to predict one or more characters for insertion between adjacent characters of the ordered sequence of characters;

wherein the first probabilistic model comprises a first language model corresponding to a domain configured to predict one or more first normalized item descriptors for shorthand descriptors, the one or more first normalized item descriptors comprising adjacent characters of the first descriptor and corresponding to the domain, and a second language model configured to predict one or more second normalized item descriptors for shorthand descriptors, the one or more second normalized item descriptors comprising adjacent characters of the first descriptor and corresponding to a corrected formatting of the first descriptor;

one or more processors; and a computer readable storage medium storing program instructions that, when executed by the one or more processors cause the ticket translation module to:

receive a plurality of candidate item descriptors as output from the first probabilistic model, each of which correspond to the first descriptor, each candidate item descriptor comprising adjacent characters of the first descriptor and one or more characters inserted between the adjacent characters, the plurality of candidate item descriptors determined using normalized item descriptors output by the first and second language models based on the adjacent characters of the first descriptor, identify a candidate item descriptor with a highest probability of matching the first descriptor relative to the plurality of candidate item descriptors, and assign the candidate item descriptor with the highest probability of matching the first descriptor as a second descriptor of the item, the second descriptor comprising the adjacent characters and one or more characters inserted adjacent in the ordered sequence; and a catalog matching model for determining, based on the second descriptor, an identification of an item of an enterprise catalog corresponding to the second descriptor.

* * * * *